US011865563B2

(12) United States Patent
Xu et al.

(10) Patent No.: US 11,865,563 B2
(45) Date of Patent: Jan. 9, 2024

(54) PROTECTIVE PAINT SPRAYING EQUIPMENT FOR A WHEEL HUB

(71) Applicant: CITIC Dicastal Co., Ltd., Qinhuangdao (CN)

(72) Inventors: Weijie Xu, Qinhuangdao (CN); Zhiguang Li, Qinhuangdao (CN); Zhiliang Zhang, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 562 days.

(21) Appl. No.: 17/092,797

(22) Filed: Nov. 9, 2020

(65) Prior Publication Data

US 2021/0154695 A1 May 27, 2021

(30) Foreign Application Priority Data

Nov. 25, 2019 (CN) ......................... 201911161770.3

(51) Int. Cl.

| | |
|---|---|
| ***B05B 13/04*** | (2006.01) |
| ***B05B 13/02*** | (2006.01) |
| ***B05B 15/70*** | (2018.01) |
| ***B05B 12/12*** | (2006.01) |

(52) U.S. Cl.

CPC ............ *B05B 15/70* (2018.02); *B05B 12/122* (2013.01); *B05B 13/0221* (2013.01); *B05B 13/0285* (2013.01); *B05B 13/0431* (2013.01)

(58) Field of Classification Search

CPC ..... B24B 49/04; B24B 49/05; B05B 13/0221; B05B 13/0431

See application file for complete search history.

(56) References Cited

U.S. PATENT DOCUMENTS

| | | | | |
|---|---|---|---|---|
| 9,192,953 | B2 * | 11/2015 | Hendricks, Sr. | F04B 43/1261 |
| 2007/0062632 | A1 * | 3/2007 | Yarimizu | B05B 7/1263 427/425 |
| 2009/0061099 | A1 * | 3/2009 | Hendricks, Sr. | B05B 12/126 118/713 |
| 2014/0041578 | A1 * | 2/2014 | Hendricks, Sr. | B29D 30/0061 901/43 |
| 2018/0243780 | A1 * | 8/2018 | Qin | B05C 19/00 |
| 2019/0001361 | A1 * | 1/2019 | Giusti | B05C 11/1021 |
| 2019/0291480 | A1 * | 9/2019 | Lv | G01B 5/08 |
| 2020/0139394 | A1 * | 5/2020 | She | B05B 12/082 |

* cited by examiner

*Primary Examiner* — Karl Kurple

(74) *Attorney, Agent, or Firm* — IPro, PLLC

(57) ABSTRACT

Disclosed is a protective paint spraying equipment for a wheel hub including a centering device, a paint spraying device and a review device. This equipment covers a protective paint film with a certain hardness and transparency on a QR code of the hub, effectively avoiding damage to the QR code by the hub during the loading process, ensuring full flow traceability of the hub.

5 Claims, 3 Drawing Sheets

PROTECTIVE PAINT SPRAYING EQUIPMENT FOR A WHEEL HUB

TECHNICAL FIELD

The invention relates to a spraying device, in particular to a protective paint spraying equipment for a wheel hub.

BACKGROUND

At present, in the field of hub manufacturing, there is a growing demand for accurate tracing of hub information. Customization processing of individual hubs is gradually becoming a trend. A corresponding two-dimensional code capable of representing different information of each hub is generated at the right moment. The two-dimensional code is formed by engraving a metal surface by applying laser technology. However, in actual production, a part of the two-dimensional codes cannot be identified. One of the reasons for this is that the two-dimensional codes are damaged by aluminum scraps during the hub machining process, leading to identification fails. And therefore, full-process information tracing and customized machining cannot be achieved throughout the entire hub machining process. Therefore, there is an urgent need for technology and equipment that can prevent damage to the two-dimensional code. This will avoid the situation where normal information tracing is affected due to the fact that the two-dimensional code cannot be identified, and meanwhile customized production of individual hubs can be guaranteed.

SUMMARY

In view of this, the present invention provides a protective paint spraying equipment for a wheel hub that protects a two-dimensional code with coating of protective paint and solving the problem occurring if the two-dimensional code is scratched by aluminum chips before the hub blank enters the machining, which would create a problem where the two-dimensional code is unrecognizable.

In order to achieve the purpose, the technical scheme of the invention is realized as follows:

A protective paint spraying equipment for a wheel hub, comprising: a centering device to center the hub on the protective paint spraying equipment;

A paint spraying device that can identify the horizontal position of the QR code on the hub and spray an area of the QR code; And A review device that can identify the horizontal position of the QR code and the spraying position and align the horizontal position of the QR code with the spraying position.

In some embodiments, the paint spraying device includes a first optical camera that can read the two-dimensional code and determine the two-dimensional code depth information.

In some embodiments, the centering device comprises a fixing plate on which an air cylinder and a synchronization link slider mechanism are provided, the synchronization link comprises a guide rail mounted on the fixing plate, a first centering slider and a second centering slider are provided in parallel on the guide rail, a symmetric connecting rod is provided between the two centering sliders, a central portion of the symmetric connecting rod is hinged on the fixing plate, two ends of the symmetric connecting rod are hinged at one end of the first synchronous connecting rod and the second synchronous connecting rod, respectively, and the other end of the first synchronous connecting rods hinged at the first centering slide.

In some embodiments, the paint spraying device includes a spray gun disposed on a three-axis linkage.

In some embodiments, the three-axis linkage comprises a longitudinal guide rail, a longitudinal slider provided on the longitudinal guide rail, a transverse guide rail perpendicular to a horizontal direction of the longitudinal guide rail, a transverse slider provided on the transverse guide rail, a vertical guide rail perpendicular to a vertical direction of the transverse guide rail, a vertical slider provided on the vertical guide rail, and a spray gun provided on the vertical slider.

In some embodiments, a baffle plate is provided horizontally on the longitudinal slider.

In some embodiments, the review device includes a second optical camera.

Compared with the prior art, the protective paint spraying equipment for a wheel hub provided by the invention has the following advantages:

The protective paint spraying equipment protects the two-dimensional code on a wheel hub by covering the QR code with a transparent layer of protective paint with a certain hardness and the transparent paint film on the QR code of the wheel hub is effective to avoid disruption of the QR code during the loading process and to avoid loss of information due to disruption of the QR code and to ensure full flow traceability of the wheel hub.

BRIEF DESCRIPTION OF FIGURES

The accompanying drawings, which are included to provide a further understanding of the invention, illustrate embodiments of the invention and together with the description serve to explain the invention and do not constitute a limitation of the invention. In the drawings.

DESCRIPTION OF REFERENCE NUMERALS

1: drum-type rollgang; 2: centering device; 3: in-place photoelectronic device; 7: paint spraying device; 8: first optical camera; 12: second optical camera; 201: air cylinder; 202: fixing plate; 204: first centering slider; 205: guide column; 206: guide rail; 208: first synchronous connecting rod; 212: second synchronous connecting rod; 211: symmetric connecting rod; 213: second centering slider; 701: spray gun; 702: vertical guide rail; 703: vertical slider; 704: transverse slider; 705: transverse guide rail; 706: longitudinal slider; 707: baffle plate; and 708: longitudinal guide rail.

DETAILED DESCRIPTION

It should be noted that embodiments of the present disclosure and features of the embodiments may be combined with one another without conflict.

The technical solution of the present disclosure will be described clearly and completely hereinafter with reference to the accompanying drawings and in combination with embodiments, and obviously, the embodiments described are only a part of embodiments of the present disclosure, and are not all of embodiments thereof. Based on the embodiments of the present disclosure, all other embodiments obtained by a person of ordinary skill in the art without involving any inventive effort fall within the protection scope of the present disclosure.

The protective paint spraying equipment for a wheel hub of an embodiment of the present invention is described below in conjunction with an embodiment with reference to FIG. 1-4.

Figure 1:
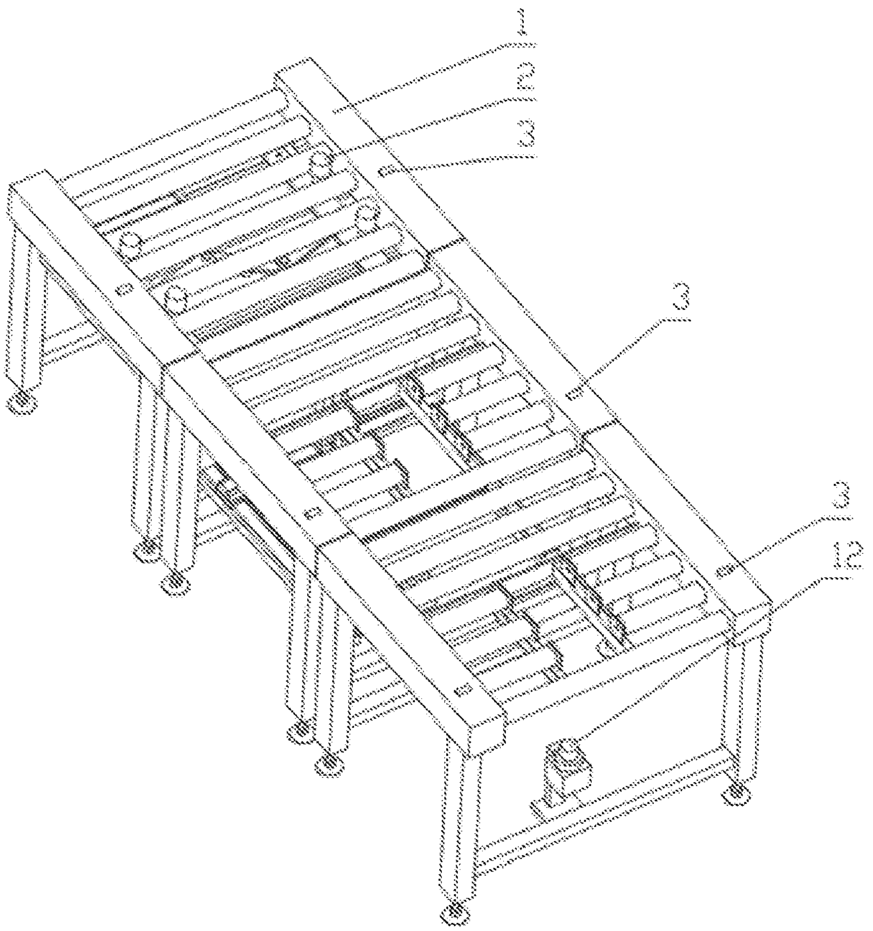
FIG. 1 is a schematic representation of protective paint spraying equipment for a wheel hub according to the present invention.
Figure 2:
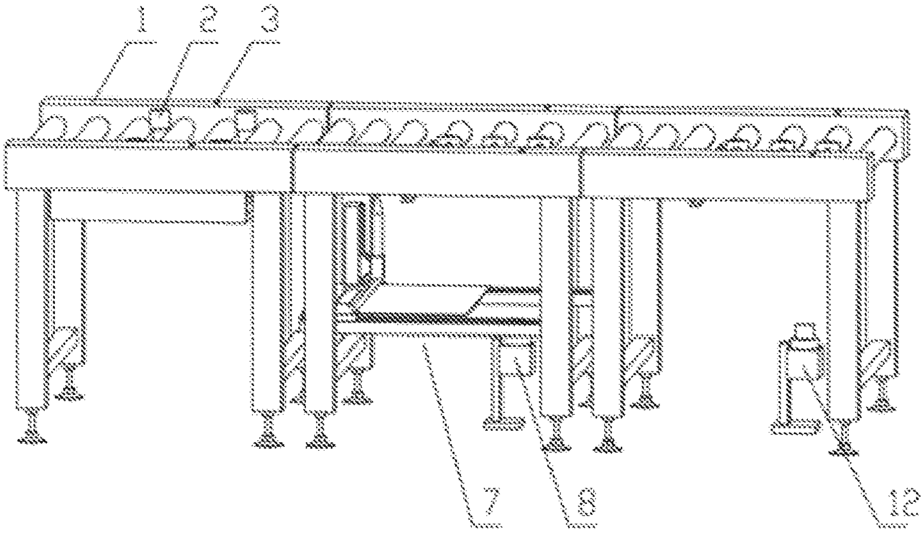
FIG. 2 a schematic diagram of two of the protective paint spraying equipment for a wheel hub of the present invention.
Figure 4:
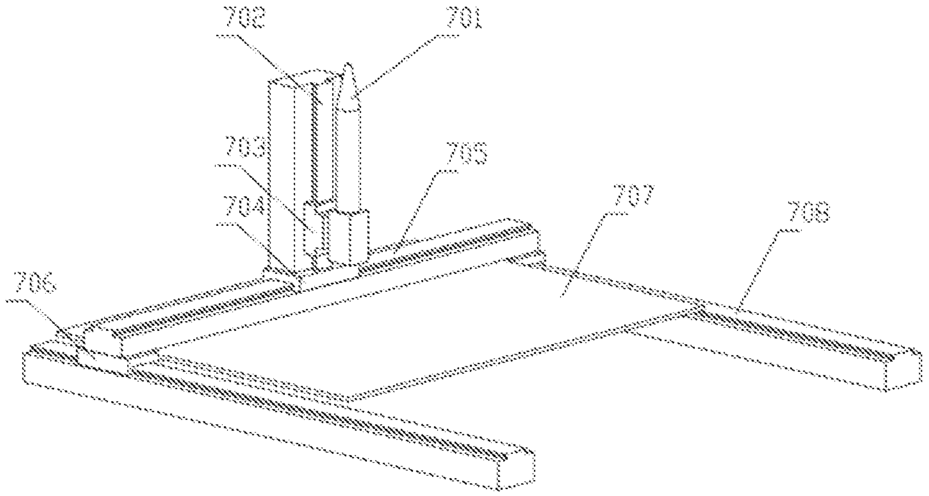
FIG. 4 is a schematic representation of the spray device of the protective paint spraying equipment for a wheel hub according to the present invention.

In some embodiments, as shown in FIG. 1, FIG. 2, FIG. 4, an apparatus for in-line spraying paint for protecting hub cavity backed two-dimensional code position includes a centering station, a spraying station, and a review station, characterized in that: the centering station includes drum-type rollgang I and centering device 2, in-place photoelectronic device 3 disposed on both sides of the roll table 1 at the centering device 2 position; The paint spray station comprises drum-type rollgang I and a paint spraying device, an oblong rectangular hole is provided in the middle of the table 4 of the spraying position, A first optical camera 8 is provided directly below the rectangular hole and an in-place photoelectronic device 3 is provided on either side of the table 4 at the location of the rectangular hole, the paint spinning device comprises a spray gun 701, a baffle plate 707 and a three-axis linkage mechanism with a longitudinal guide rail 708 fixed on the table support, a longitudinal slider 706 above the longitudinal guide rail 708, a transverse guide rail 705 fixed on the longitudinal slider 706, a transverse slider 704 above the transverse guide rail 705, a transverse slider 704, a transverse guide rail 702 fixed on the transverse slider 704, and a transverse guide rail The review station comprises drum-type rollgang I and second optical camera I2, in the middle of the table just above the second optical camera I2 a rectangular hole is provided, in-place photoelectronic device 3 is provided on both sides of the table at the location of the rectangular hole.

Figure 3:
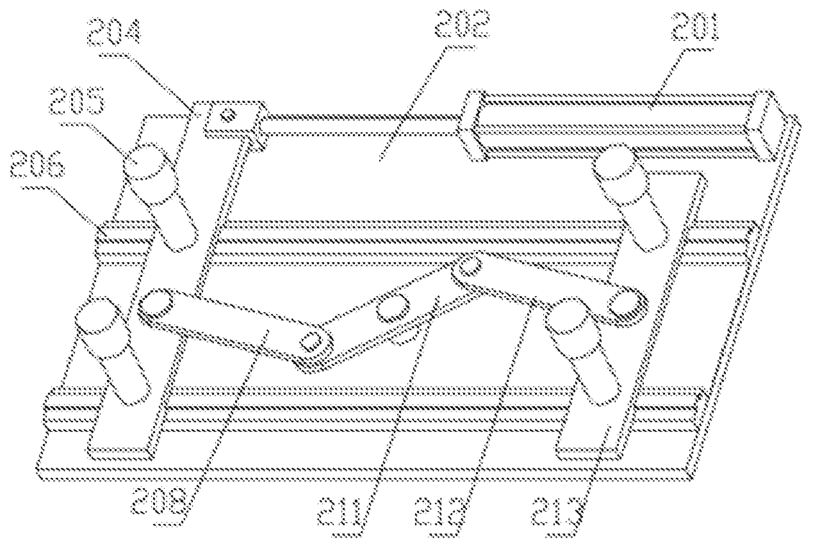
FIG. 3 is a schematic representation of the centering device of the protective paint spraying equipment for a wheel hub of the present invention.

As shown in FIG. 3, The centering device comprises a fixing plate 202, an air cylinder 201 and a synchronization link slider mechanism, the fixing plate 202 being mounted on a roller support of the centering station, an air cylinder 201 being mounted on the fixing plate 202, a parallel double guide rail 206 being arranged in parallel with the air cylinder 201 on the fixing plate 202, a first centering slider 204 being fitted on the guide rail 206, a second centering slider 213 being fitted on the end of an air cylinder 201 piston rod being coupled by a pin shaft, two guide columns 205 being mounted symmetrically on either side of either one of the centering slider, the first centering slider 204 and the second centering slider 213, The synchronization link slider mechanism comprises a central pin fixed to fixing plate 202, on which is mounted a symmetric connecting rod 211, which is coupled to first synchronous connecting rod 208 and second synchronous connecting rod 212 at both ends by a pin, the other end of first synchronous connecting rod 208 is coupled to first centering slider 204 by a pin, and the other end of second synchronous connecting rod 212 is coupled to second centering slider 213 by a pin.

As shown in FIGS. 1, 2, 3, 4, in actual use, the hub first enters the centering station, the in-place photoelectronic device 3 trigger signal controls the air cylinder 201 to contract, center the hub by centering device 2, after some delay the air cylinder 201 automatically elongates and the centering device expands; The hub then enters a spray painting station, the paint spraying device is in the original state, i.e. Spray gun 701 is located at the foremost end, Baffle plate 707 non-occluded rectangular aperture below optical camera 8, The optical camera 8 recognizes the hub back cavity QR code, obtaining a wheel type and a QR code horizontal position, In this case, the three-axis linkage mechanism drives the longitudinal slider 706 and the transverse slider 704 according to the horizontal position of the QR code to move the spray gun 701 directly below the QR code, At this point baffle plate 707 occludes the optical camera 8 below the rectangular hole, then the three axis linkage mechanism moves the spray gun 701 a certain distance below the QR code based on the depth information of the QR code corresponding to the obtained wheel type information, spray protective paint, and end up with the roller table 4 pushing the hub forward while the paint spraying device returns to the original state; In turn, the hub enters a review station, a second optical camera 12 below the rectangular hole identifies the hub cavity backed QR code, obtaining the horizontal position of the QR code and at the same time obtaining the horizontal position of the localized shiny area due to the painting, confirming that the protective paint has not been sprayed in other areas by comparing the difference between the horizontal position of the QR code and the painted area, ensuring the protective paint film quality of the subsequent hub after the painting process; The final hub enters a subsequent station and is cured by heating above 100° C. to achieve a certain hardness.

Compared with the prior art, the protective paint spraying equipment for a wheel hub of the present invention has the following advantages:

The protective paint spraying equipment for a wheel hub covers a layer of protective paint with a certain hardness and transparent paint film over the QR code of the wheel hub, which is effective to avoid disruption of the QR code caused by the wheel hub during the loading process, to avoid loss of information due to disruption of the QR code, and to ensure full flow traceability of the wheel hub.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A protective paint spraying equipment for a wheel hub, comprising:

a centering device, wherein the centering device is configured to center the wheel hub on the protective paint spraying equipment;

a paint spraying device, wherein the paint spraying device is configured to identify a horizontal position of a two-dimensional code on the wheel hub and spray the area of the two-dimensional code; and a review device, wherein the review device is configured to identify the horizontal position of the two-dimensional code and a spraying position, and compare the horizontal position of the two-dimensional code with the spraying position, wherein the paint spraying device comprises a first optical camera, and the first optical camera is configured to read the two-dimensional code and determine depth information of the two-dimensional code;

wherein the centering device comprises a fixing plate, an air cylinder on the fixing plate, a guide rail mounted on the fixing plate, a first centering slider and a second centering slider arranged in parallel on the guide rail, a symmetric connecting rod between the first centering slider and the second centering slider, a first synchronous connecting rod and a second synchronous connecting rod;

wherein a center of the symmetric connecting rod is hinged to the fixing plate, two ends of the symmetric connecting rod are hinged to a first end of the first synchronous connecting rod and a first end of the second synchronous connecting rod respectively, a second end of the first synchronous connecting rod is hinged to the first centering slider, a second end of the second synchronous connecting rod is hinged to the second centering slider, and an output end of the air cylinder is connected with the first centering slider or the second centering slider.

2. The protective paint spraying equipment for the wheel hub according to claim 1, wherein the paint spraying device comprises a spray gun, and the spray gun is arranged on a three-axis linkage mechanism.

3. The protective paint spraying equipment for the wheel hub according to claim 2, wherein the three-axis linkage mechanism comprises a longitudinal guide rail, a longitudinal slider is arranged on the longitudinal guide rail, a transverse guide rail perpendicular to a horizontal direction of the longitudinal guide rail is arranged on the longitudinal slider, a transverse slider is arranged on the transverse guide rail, a vertical guide rail perpendicular to a vertical direction of the transverse guide rail is arranged on the transverse slider, a vertical slider is arranged on the vertical guide rail, and the spray gun is arranged on the vertical slider.

4. The protective paint spraying equipment for the wheel hub according to claim 3, wherein a baffle plate is arranged on the longitudinal slider in the horizontal direction.

5. The protective paint spraying equipment for the wheel hub according to claim 1, wherein the review device comprises a second optical camera.

* * * * *